United States Patent
Shah et al.

(10) Patent No.: US 10,107,384 B2
(45) Date of Patent: Oct. 23, 2018

(54) TWO-PIECE SINTERED METAL RAVIGNEAUX CARRIER

(71) Applicant: Toyota Motor Engineering & Manufacturing North America, Inc., Erlanger, KY (US)

(72) Inventors: Shail N. Shah, Ann Arbor, MI (US); Nicholas S. Vernon, Brighton, MI (US); Shinji Oita, Ann Arbor, MI (US)

(73) Assignees: Toyota Motor Engineering & Manufacturing North America, Inc., Plano, TX (US); AISIN AW Co., Ltd., Anjo-Shi, Aichi-Ken (JP)

( * ) Notice: Subject to any disclaimer, the term of this patent is extended or adjusted under 35 U.S.C. 154(b) by 155 days.

(21) Appl. No.: 15/219,395

(22) Filed: Jul. 26, 2016

(65) Prior Publication Data

US 2018/0031113 A1 Feb. 1, 2018

(51) Int. Cl.
*F16H 57/08* (2006.01)
*F16H 57/10* (2006.01)
*F16H 3/66* (2006.01)

(52) U.S. Cl.
CPC ........... *F16H 57/082* (2013.01); *F16H 3/663* (2013.01); *F16H 57/10* (2013.01)

(58) Field of Classification Search
None
See application file for complete search history.

(56) References Cited

U.S. PATENT DOCUMENTS

| 3,939,736 | A | | 2/1976 | Morin | |
|---|---|---|---|---|---|
| 4,838,123 | A | * | 6/1989 | Matoba | F16H 1/2809 475/335 |
| 5,098,358 | A | | 3/1992 | Igaku | |
| 5,382,203 | A | | 1/1995 | Bellman et al. | |
| 6,863,636 | B2 | | 3/2005 | Huber et al. | |
| 7,033,301 | B2 | | 4/2006 | Kimes | |
| 7,556,583 | B2 | | 7/2009 | Wang et al. | |
| 8,042,247 | B2 | | 10/2011 | Dunkle et al. | |
| 8,187,141 | B2 | | 5/2012 | Goleski | |

(Continued)

FOREIGN PATENT DOCUMENTS

| JP | 2007268575 A | * 10/2007 | ........... F16H 57/082 |
|---|---|---|---|
| JP | 2016003672 | 12/2016 | |
| JP | 2016003676 | 12/2016 | |

OTHER PUBLICATIONS

U.S. Appl. No. 15/219,424, filed Jul. 26, 2016 (not yet published).

(Continued)

*Primary Examiner* — Jacob S. Scott
(74) *Attorney, Agent, or Firm* — Christopher G. Darrow; Darrow Mustafa PC

(57) ABSTRACT

A Ravigneaux planetary carrier assembly is provided for accommodating pinion gears of an automatic transmission. The carrier assembly comprises a powder metal carrier member including a carrier plate having a plurality of integral carrier legs extending therefrom, and a powder metal cover member including a cover plate having a plurality of integral cover legs extending therefrom. The carrier assembly is arranged such that respective ends of the carrier legs and ends of the cover legs are aligned with and brazed to one another, defining an interior of the carrier assembly configured to house the pinion gears.

11 Claims, 7 Drawing Sheets

(56) References Cited

U.S. PATENT DOCUMENTS

| | | |
|---|---|---|
| 8,491,439 B2 | 7/2013 | Kimes et al. |
| 8,491,440 B2 | 7/2013 | Kimes et al. |
| 8,523,550 B2 | 9/2013 | Wehrli et al. |
| 8,574,119 B1 | 11/2013 | Kinter |
| 8,961,359 B2 * | 2/2015 | Floro .................... F16D 13/76 475/159 |
| 9,034,246 B2 | 5/2015 | Voice |
| 9,121,276 B2 | 9/2015 | Heidecker et al. |
| 9,273,737 B2 | 3/2016 | Heuver et al. |
| 2004/0077455 A1* | 4/2004 | Huber ................... F16H 57/082 475/331 |
| 2004/0235610 A1 | 11/2004 | Jang et al. |
| 2006/0275607 A1 | 12/2006 | Demir et al. |
| 2007/0081915 A1 | 4/2007 | Trasorras et al. |
| 2009/0062058 A1 | 3/2009 | Kimes et al. |
| 2010/0105515 A1 | 4/2010 | Goleski et al. |
| 2012/0003443 A1 | 1/2012 | Gubanich et al. |
| 2013/0252012 A1 | 9/2013 | Cooper et al. |
| 2015/0047942 A1 | 2/2015 | Kimes et al. |
| 2015/0061188 A1 | 3/2015 | Hasegawa et al. |
| 2015/0314547 A1 | 11/2015 | Grobl et al. |
| 2015/0367414 A1 | 12/2015 | Kronberger |
| 2016/0061315 A1 | 3/2016 | Taylor et al. |
| 2016/0107235 A1 | 4/2016 | Wilkinson |
| 2017/0252844 A1* | 9/2017 | Hirono .................... B23K 1/19 |

OTHER PUBLICATIONS

U.S. Appl. No. 15/219,436, filed Jul. 26, 2016 (not yet published).
U.S. Appl. No. 15/443,657, filed Feb. 27, 2017 (not yet published).

* cited by examiner

US 10,107,384 B2

TWO-PIECE SINTERED METAL RAVIGNEAUX CARRIER

TECHNICAL FIELD

The present disclosure generally relates to a planetary carrier assembly for a transmission, and more specifically, to a two-piece sintered metal Ravigneaux carrier assembly and method for making the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Transmission components must be high strength and suitable for high torque capacities. Powder metal transmission components provide several technical benefits, and are becoming more attractive from manufacturing strategies and perspectives. The Ravigneaux planetary gearset is a double planetary gearset that is commonly used in various automatic transmission assemblies to efficiently achieve a variety of gear ratios. The Ravigneaux carrier structure includes two decks of gears that share a common carrier, but each mesh with a unique sun gear. A typical powder metal Ravigneaux carrier structure includes three pieces in order to accommodate the two decks of pinion gears, namely a cylindrical shell or drum, a support member, and a backing plate.

Generally, reducing the number of parts in any assembly reduces part management costs, as well as material costs. Specifically with respect to powder metal, the green components are fragile prior to sintering. Thus, a reduction in the number of separate powder metal components not only reduces part count, but also reduce part handling, which can reduce any risk of breakage, quality issues, or defects.

Accordingly, there remains a need for an improved powder metal carrier assembly that provides strength and ease of manufacture, with the ability to meet the high torque requirements needed for use in a transmission.

SUMMARY

This section provides a general summary of the disclosure, and is not a comprehensive disclosure of its full scope or all of its features.

In various aspects, the present teachings provide a planetary carrier assembly for a transmission. The carrier assembly has a powder metal carrier member comprising a carrier plate including a plurality of carrier legs integral with, and extending a distance from, the carrier plate. The carrier assembly also includes a powder metal cover member comprising a cover plate having a plurality of cover legs integral with, and extending a distance from, the cover plate. The carrier assembly is arranged such that respective ends of the carrier legs and ends of the cover legs are aligned with and secured to one another, for example, with braze joints.

In other aspects, the present teachings provide a Ravigneaux planetary carrier assembly for an automatic transmission. The carrier assembly may include first and second sets of pinion gears. A unitary, powder metal carrier member is provided, including a carrier plate having a plurality of integral carrier legs extending therefrom. A unitary, powder metal cover member is also provided, including a cover plate having a plurality of integral cover legs extending therefrom. The carrier assembly is arranged such that respective ends of the carrier legs and ends of the cover legs are aligned with and brazed to one another, defining an interior of the carrier assembly configured to house the first and second sets of pinion gears.

In still other aspects, the present teachings provide a method for assembling a two-component Ravigneaux planetary carrier assembly. The method may include aligning (1) a powder metal carrier member comprising a carrier plate having a plurality of integral carrier legs extending therefrom, and (2) a powder metal cover member comprising a cover plate having a plurality of integral cover legs extending therefrom. In various aspects, the alignment results in respective ends of the carrier legs and ends of the cover legs being aligned with one another to form a subassembly. Once aligned, the method may include sintering the subassembly to secure respective legs of the carrier member to the cover member. In various aspects, the method may include disposing a braze material adjacent the respective ends of the carrier legs and the cover legs prior to sintering the subassembly.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the devices and methods among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a two-piece sintered metal Ravigneaux planetary carrier assembly that may be used for accommodating various pinion gears and components of a transmission, and in particular, an automatic automobile transmission. The carrier assembly comprises two main sintered metal components. The first main component is a powder metal carrier member, which generally may include a carrier plate having a plurality of integral carrier legs perpendicularly extending a distance therefrom. The second main component is a powder metal cover member including a cover plate having a plurality of integral cover legs perpendicularly extending therefrom. In various aspects, the carrier assembly is generally arranged such that respective ends of the carrier legs and ends of the cover legs are aligned with and brazed to one another. The arrangement of the carrier member and the cover member defines an interior of the carrier assembly configured to house various pinion gears.

Figure 1:
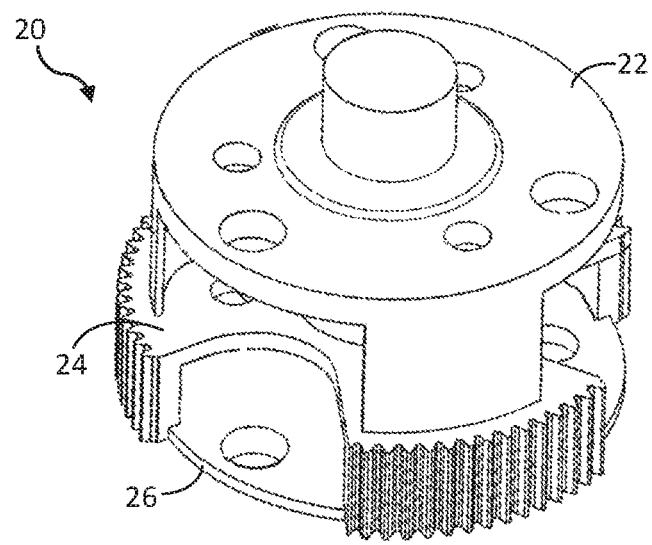
FIG. 1 is perspective view of an exemplary prior art, three-piece Ravigneaux carrier assembly.

Ravigneaux planetary gear structures can be used in automatic transmissions to achieve a variety of gear ratios, and may include two tiers, or decks, of pinion gears that share a common carrier. FIG. 1 is perspective view of an exemplary prior art, three-piece Ravigneaux carrier assembly 20. As shown, the typical prior art carrier assembly 20 generally includes a support member 22, a cylindrical shell or drum 24, and a backing, or end plate 26.

Figure 2:
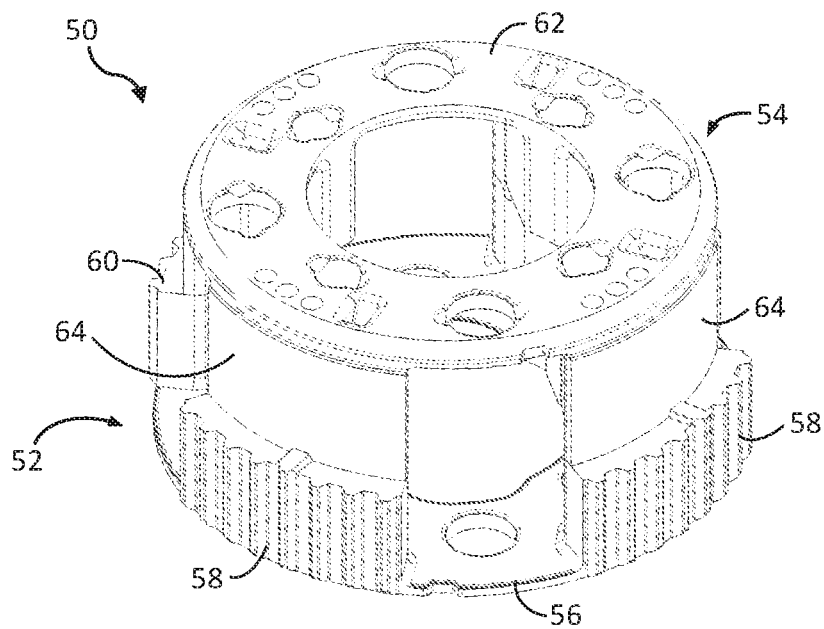
FIG. 2 is a perspective view of a Ravigneaux carrier assembly with a carrier member secured to a cover member according to various aspects of the present disclosure.

The present technology provides an accommodation of the two decks of gears by using a two-piece powder metal carrier assembly. As such, the present technology reduces, among other things, part count, manufacturing costs, and production time. FIG. 2 is a perspective view of an exemplary two-piece Ravigneaux carrier assembly 50 with a powder metal carrier member 52 secured to a powder metal cover member 54 according to various aspects of the present disclosure.

In various aspects, the carrier member 52 may be a unitary, monolithic component (i.e., formed as one component), and includes a substantially circular carrier plate 56 portion including a plurality of angularly spaced-apart carrier legs 58 integral with the carrier plate 56. The carrier legs 58 may be provided with a substantially uniform length, extending to a free end 60. For example, a distance between an outer face 56a (see, FIG. 9) of the carrier plate 56 and the free end 60 of the carrier leg 58 may generally be the same for each spaced-apart carrier leg 58. Similar to the shape and design of the carrier plate 52, in various aspects, the cover member 54 may be a unitary, monolithic component (i.e., formed as one component), and includes a substantially circular cover plate 62 including a plurality of angularly spaced-apart cover legs 64 integral with the cover plate 62.

The cover legs 64 may be provided with a uniform length, extending to a free end 66. For example, a distance between an outer face 62a (see, FIG. 7) of the cover plate 62 and the free end 66 of the cover leg 64 may generally be the same for each spaced-apart cover leg 64. The two-piece carrier assembly 50 is generally arranged such that respective ends 60 of the carrier legs 58 and ends 66 of the cover legs 64 are, at least partially, aligned with and secured to one another. In various aspects, the respective ends are joined together by braze joints that, by way of non-limiting example, can be formed during a sintering process using suitable brazing material. The arrangement of the carrier member 52 and the cover member 54 defines an interior 80 (see, FIG. 5) of the carrier assembly 50 configured to house various pinion gears and related components.

It should be understood that FIG. 2, and its related description, is with respect to one presently chosen embodiment, and various changes can be made to the design without impacting the overall function, purpose, and operation. In certain aspects, for example, the legs may have unequal sizes, shapes, and/or lengths, in whole or in part, but still form a two-piece carrier assembly. Further, although it may be preferable that the carrier member 52 and cover member 54 be monolithic, unitary components, there may be certain desirable aspects where at least a portion of the carrier member 52 or cover member 54 comprises two or more components mechanically (or otherwise) fastened, secured, or otherwise joined together.

Powder metallurgy techniques cover a wide range of ways in which materials or components are made from metal powders. As such, the powder metal compositions of the present technology can be tailored to specific or desired end uses. In various aspects, the carrier member 52 and the cover member 54 can comprise the same or substantially similar powder metal composition. In other aspects, it may be desirable that the carrier member 52 and the cover member 54 have different powder metal compositions.

Figure 3A:
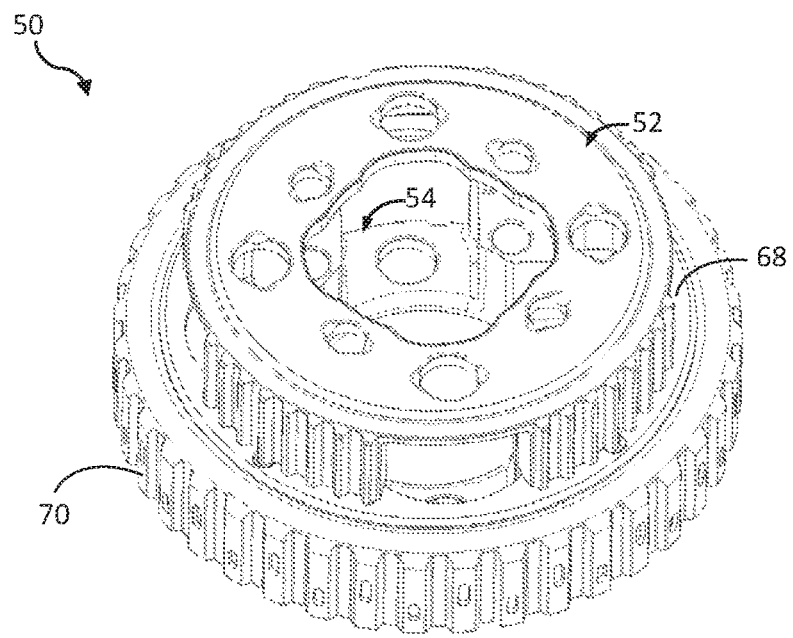
FIG. 3A is a first perspective view of the carrier assembly of FIG. 2 further including a sleeve member and brake hub.
Figure 3B:
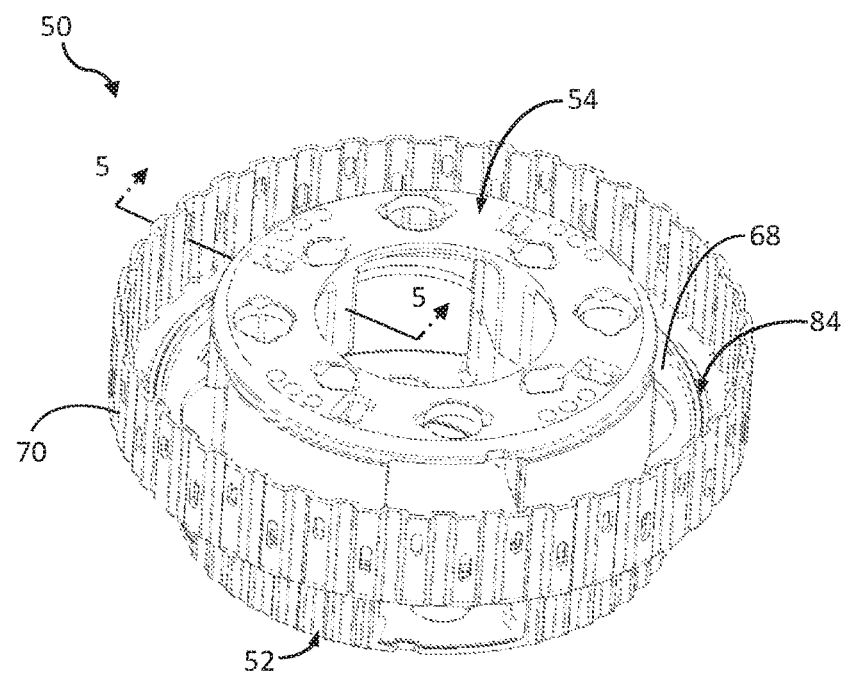
FIG. 3B is a second perspective view of the carrier assembly of FIG. 2 further including a sleeve member and brake hub.

In various aspects, it may be desirable for the carrier assembly 50 to also include auxiliary components that cooperate with functions of an automotive transmission. Non-limiting examples of auxiliary components may include sleeves, brake hubs, clutches, one way clutches, races, bearings, etc. Thus, the carrier assembly 50 may include at least one auxiliary component secured to one or both of the carrier member 52 and the cover member 54. It should be understood that an auxiliary component can include a plurality of parts or combined components. In certain aspects, the auxiliary member can be attached using a braze joint or weld. FIG. 3A is a first perspective view of the carrier assembly 50 further including an annular sleeve member 68 and an annular brake hub 70, shown with the carrier member 52 facing an upward direction. FIG. 3B is a second perspective view of the carrier assembly of FIG. 2 further including the sleeve member 68 and the brake hub 70, shown with the cover member 54 facing an upward direction.

Figure 4:
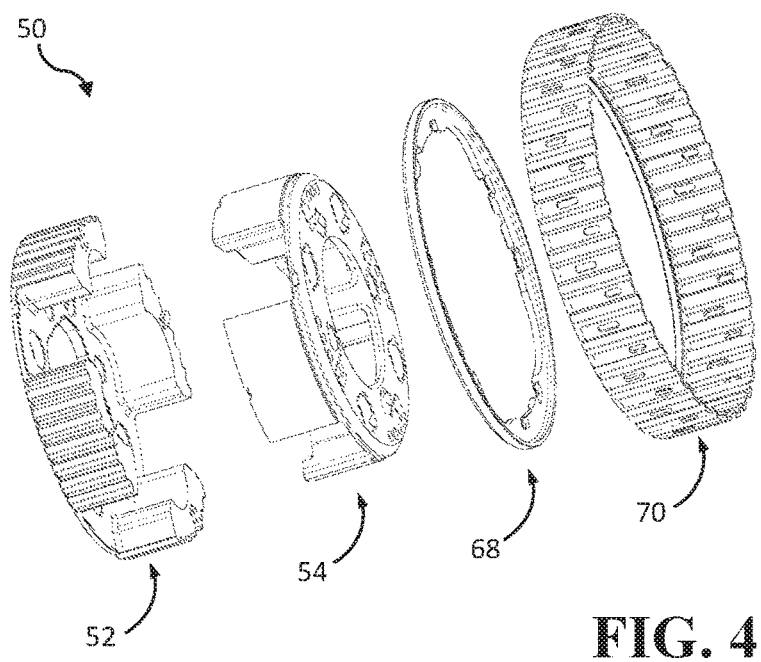
FIG. 4 is an exploded perspective view of the Ravigneaux carrier assembly of FIGS. 2 and 3.
Figure 5:
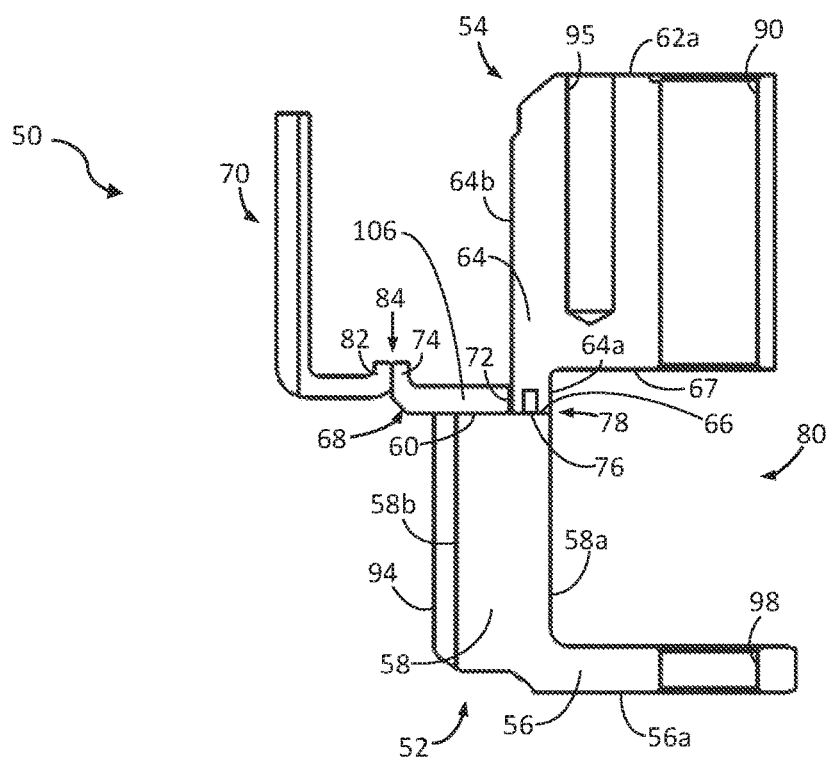
FIG. 5 is a partial cross-sectional view of FIG. 3B taken along the line 5-5.

FIG. 4 is an exploded perspective view of the Ravigneaux carrier assembly 50 of FIGS. 2 and 3. FIG. 5 is a partial cross-sectional view of FIG. 3B taken along the line 5-5 that provides additional details of the carrier assembly 50. As detailed in FIG. 5, at least a portion of an area 106 adjacent an inner perimeter 72 of a steel sleeve member 68 is secured to the carrier assembly 50 at the free ends 60 of the respective carrier legs 58 of the carrier member 52. The connection between the sleeve member 68 and the carrier member 52 is on the same plane as the connection between the respective legs 64, 58 of the cover member 54 and the carrier member 52, i.e., they are both joined to the free ends 60 of the carrier member 52.

In various aspects, the sleeve member 68 can be secured to the carrier assembly 50 by a braze joint or weld. If using a braze joint, the sleeve member 68 should be able to generally withstand the temperatures of a sintering process. In various aspects, at least one of the carrier legs 58 and cover legs 64 may define a braze material retention feature 76 in which a suitable braze material can be placed prior to the sintering. As shown in FIG. 5, for example, the end 66 of the cover leg 64 may include a small aperture or bore 76 suitable for holding the braze material in place. The braze material will melt and flow by gravity and capillary action during the brazing process. Additionally or alternatively, the end 60 of the carrier leg 58 may define a small aperture or bore (not shown). In other aspects, the auxiliary member may additionally or alternatively provide suitable braze material retention features. In still other aspects, portions of the legs 58, 64 may be shaped to guide a braze material to the appropriate joint area during a sintering process.

With continued reference to FIG. 5, in various aspects, the respective ends 60 of the carrier legs 58 and ends 66 of the cover legs 64 are aligned with and secured to one another by braze joints 78 disposed in a single plane. In certain aspects, and the auxiliary component, here the steel sleeve member 68, may also be secured to the carrier assembly 50 with the braze joint 78 in the same single plane. As shown, the respective carrier leg 58 and cover leg 64 define respective inner surfaces, or walls 58a, 64a that may be aligned substantially flush with one another, and respective outer surfaces, or walls 58b, 64b, that may be offset from one another at the location of the braze plane, which may provide a suitable joining surface for the auxiliary member.

The arrangement of the carrier member 52 and the cover member 54 at least partially defines an interior cavity 80 within the carrier assembly 50 configured to house a plurality of pinion gears and various other related components. It should be understood that the shapes of the carrier member 52 and cover member 54 may include many variations. For example, while the bottom of the cover member 54 is shown defining two substantially parallel planes 66, 67, in certain designs, there may be only one plane such that the free end 66 is aligned with plane 67. In various aspects, the carrier assembly 50 may include four spaced-apart cover legs 64 joined to a respective set of four spaced-apart carrier legs 58. As shown in FIG. 5, an inner perimeter 82 of the annular brake hub 70 may be secured to an outer perimeter 74 of the steel sleeve member 68, for example, with a weld joint 84 or equivalent fastening mechanism. In certain aspects, the steel sleeve member 68 may be re-shaped and/or press-fit with the brake hub 70 after the sintering process, and the two components may then be welded to one another to create the assembly.

Figure 6A:
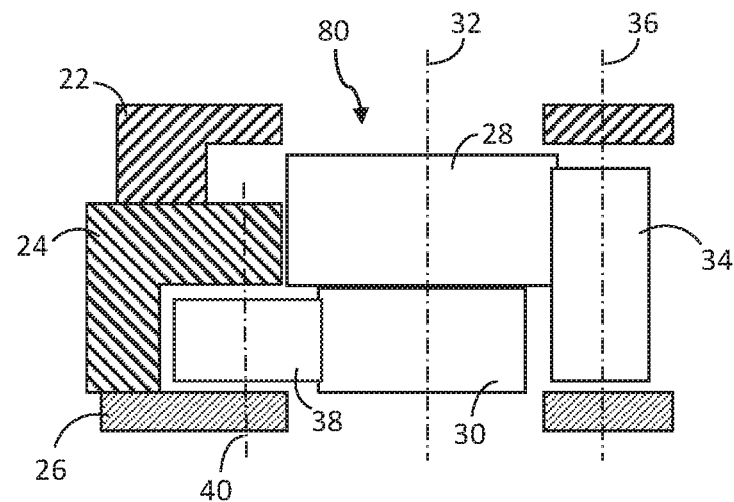
FIG. 6A is a schematic view representing a partial cross-sectional view of the prior art three-piece Ravigneaux assembly of FIG. 1.
Figure 6B:
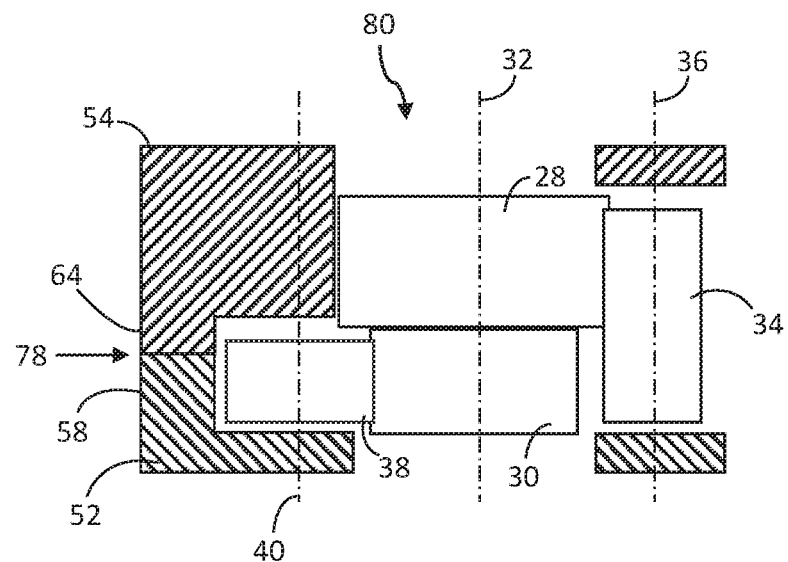
FIG. 6B is a schematic view representing a partial cross-sectional view of the two-piece Ravigneaux carrier assembly of FIG. 2 according to various aspects of the present disclosure.

FIG. 6A is a schematic view representing a partial cross-sectional view of the three-piece prior art Ravigneaux assembly of FIG. 1. For comparison purposes, FIG. 6B is a schematic view representing a partial cross-sectional view of the two-piece Ravigneaux carrier assembly of FIG. 2, according to the present disclosure. Both schematic representations illustrate a configuration with the same large sun gear 28 and small sun gear 30, sharing the same sun axis 36, as well as the same long pinion gear 34 on a long pinion axis 36, and short pinion gear 38 on a short pinion axis 40.

Figure 7:
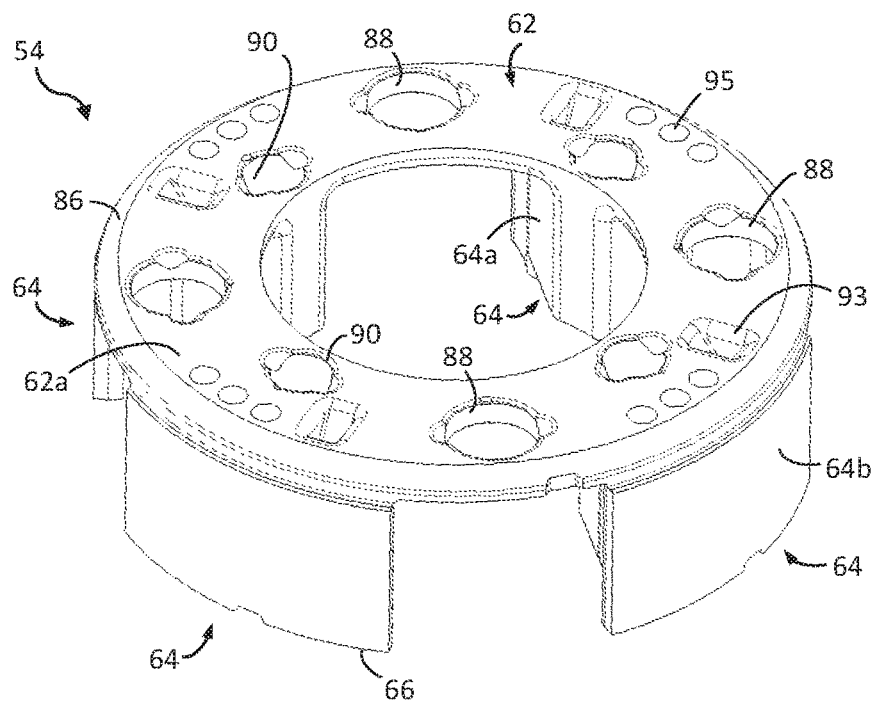
FIG. 7 is a perspective view of a powder metal cover member including a cover plate with integral cover legs extending therefrom.
Figure 8:
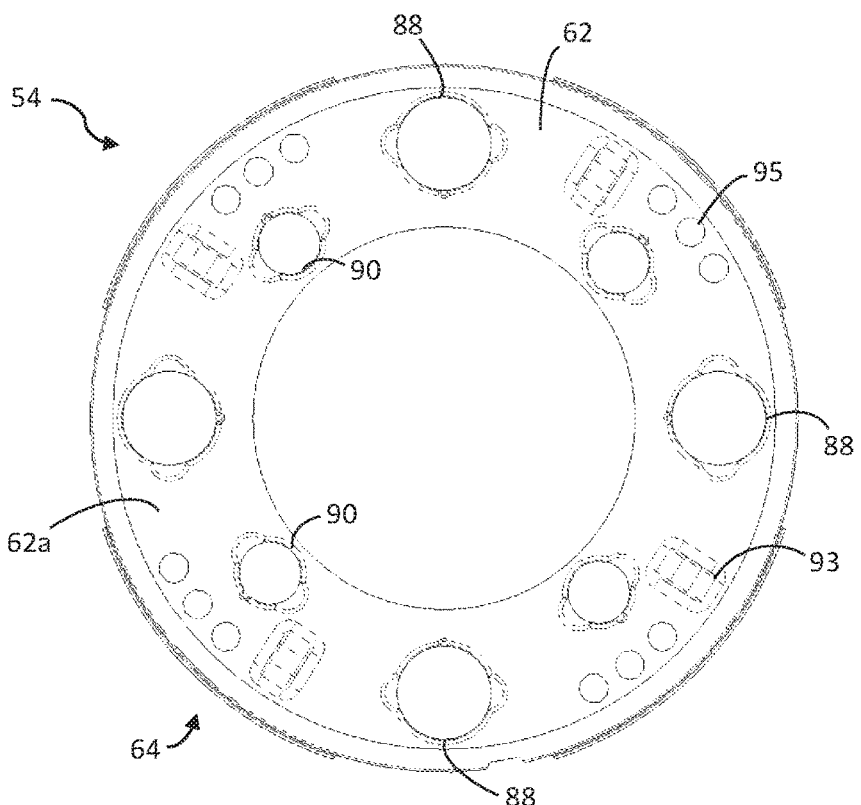
FIG. 8 is a top plan view of the powder metal cover plate member of FIG. 7.

FIG. 7 is a perspective view of an exemplary powder metal cover member 54 including a cover plate 62 portion with integral cover legs 64 extending therefrom, and FIG. 8 is a top plan view of the powder metal cover member 54 of FIG. 7. The cover plate 62 may be provided with a substantially circular shape having a flat web surface, or outer face 62a with a chamfered or curved edge 86. In various aspects, the curved edge 86 may be made by machining. The various inner walls 64a of the cover legs may be curved or shaped to accommodate the pinion gears and other components. The outer walls 64b of the legs 64 may be substantially aligned with the edge 86 of the outer face 62a. The cover plate 62 may be formed with various apertures and other features formed therein, either during the powder metal manufacturing process or machined thereafter. For example, a first plurality of angularly spaced-apart apertures 88 may be provided for the pinion shafts (not shown) of the long pinion gears 34. Similarly, a second plurality of angularly spaced-apart apertures 90 may be provided for the pinion shafts of the short pinion gears 38. As shown, the second plurality of apertures 90 extend through both the cover plate 62 as well as the cover legs 64, while the first plurality 88 of apertures extend through the cover plate 62 portion only. Additional retention features such as apertures 93, 95 may also be provided. It should be understood that other configurations of the cover member 54 may also be used, depending on the desired design.

Figure 9:
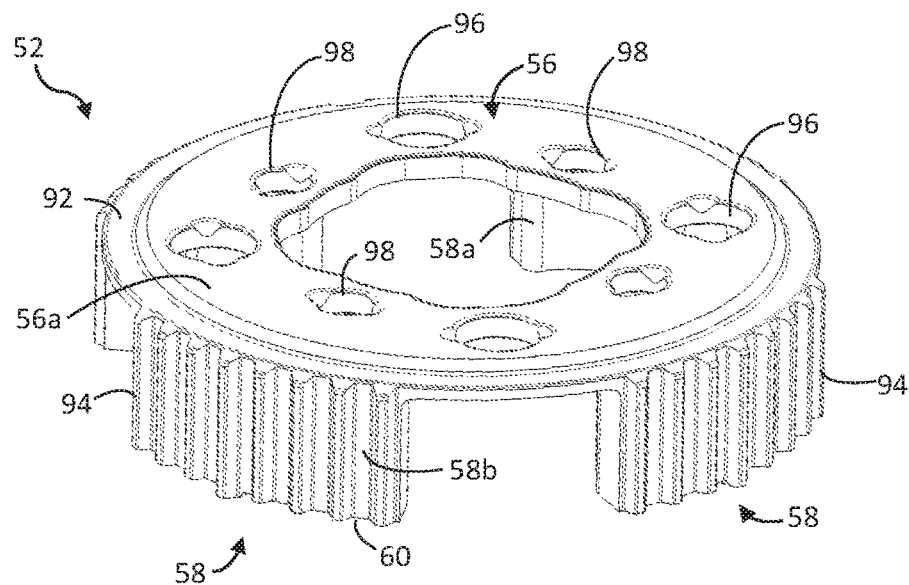
FIG. 9 is a perspective view of a powder metal carrier member including a carrier plate with integral carrier legs extending therefrom.
Figure 10:
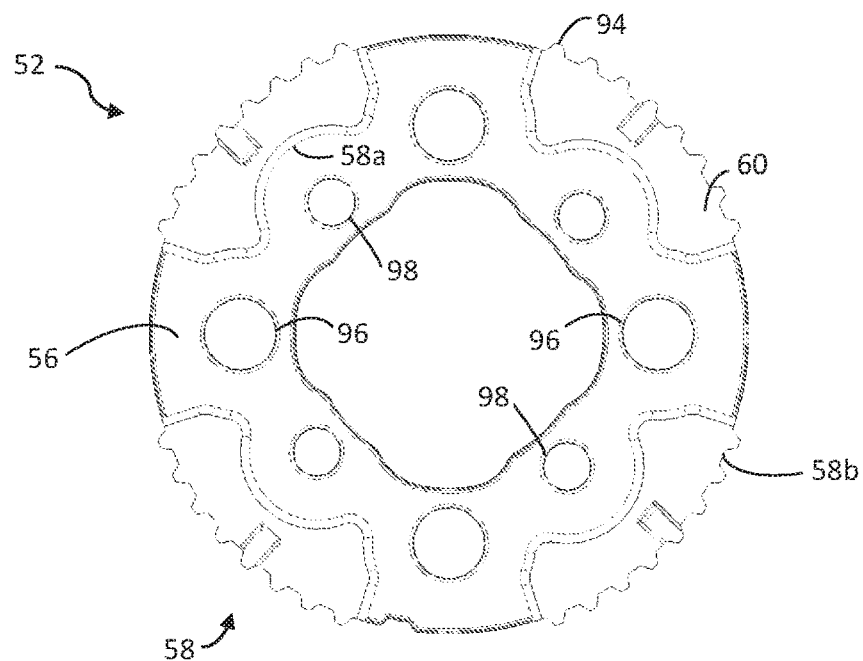
FIG. 10 is a bottom plan view of the powder metal carrier member of FIG. 9.

FIG. 9 is a perspective view of an exemplary powder metal carrier member 52 including a carrier plate 56 portion with integral carrier legs 58 extending therefrom, and FIG. 10 is a bottom plan view of the powder metal carrier member 52 of FIG. 9. The carrier plate 56 may be provided with a substantially circular shape having a flat web surface, or outer face 56a with a lowered or beveled edge 92. In various aspects, the edge 92 may be made by machining. The various inner walls 58a of the carrier legs 58 may be curved or shaped to accommodate the pinion gears and other components. The outer walls 58b of the legs 58 may be substantially aligned with the edge 92 of the outer face 56a, and optionally include spaced-apart splines 94. The carrier plate 56 may be formed with various apertures and other features formed therein, either during the powder metal manufacturing process or machined thereafter. For example, a first plurality of angularly spaced-apart apertures 96 may be provided for the pinion shafts (not shown) of the long pinion gears 34. Similarly, a second plurality of angularly spaced-apart apertures 98 may be provided for the pinion shafts of the short pinion gears 38. As shown, the first and second pluralities of apertures 96, 98 only extend through the carrier plate 56, as the inner walls 58a of the carrier legs 58 are shaped around the second plurality of apertures 98. It should be understood that other configurations of the carrier member 52 may also be used, depending on the design.

Figure 11:
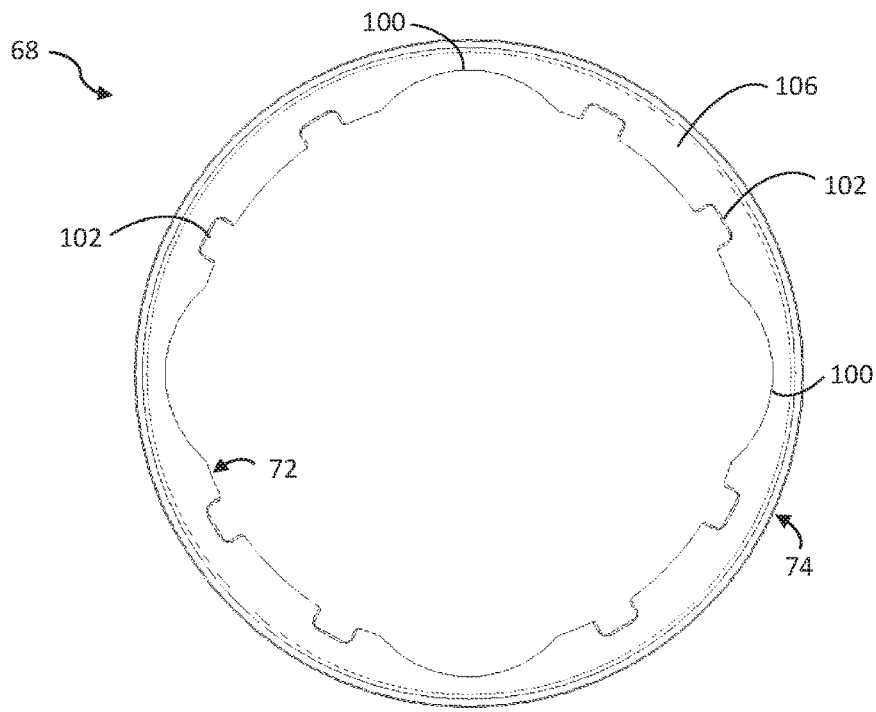
FIG. 11 is a top plan view of an exemplary sleeve member according to various aspects of the teachings of the present disclosure.
Figure 12:
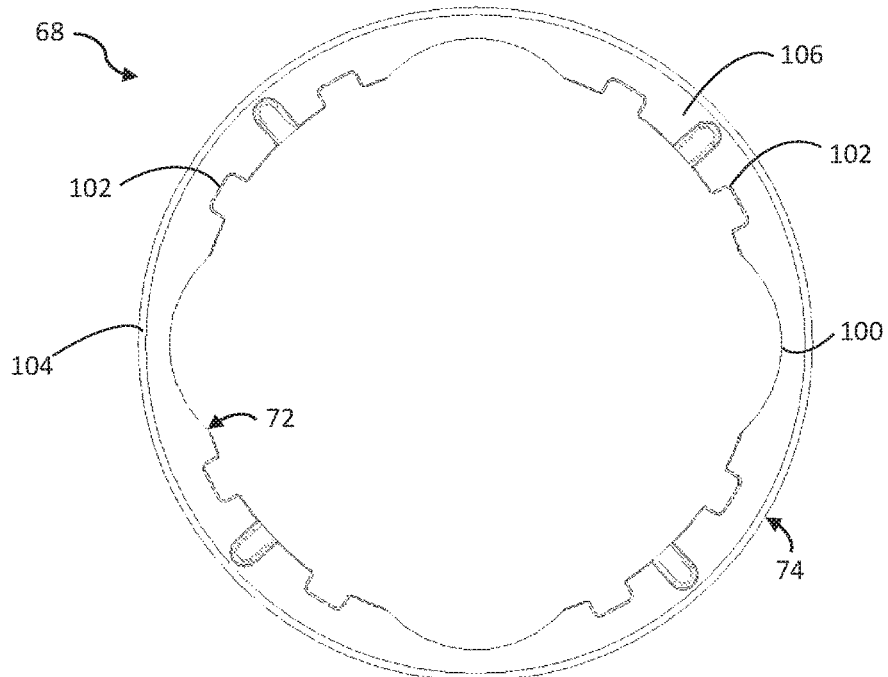
FIG. 12 is a bottom plan view of the exemplary sleeve member of FIG. 11.

FIG. 11 is a top plan view of an exemplary steel sleeve member 68 according to various aspects of the teachings of the present disclosure; and FIG. 12 is a bottom plan view of the sleeve member 68 of FIG. 11. The sleeve member 68 defines an inner perimeter 72 and an outer perimeter 74. The inner perimeter 72 may be shaped with certain areas having a radius of curvature in order to accommodate the pinions and other components. The inner perimeter may also be shaped or stamped with cut-out portions 102 that may be configured as braze material retention features. The outer perimeter 74 of the sleeve member 68 may be provided with an extending annular edge portion 104 that may provide additional strength and be used for welding to other components, such as a brake hub 70 as described above. A portion of the area 106 between the inner perimeter 72 and outer perimeter 74 may be used to secure the sleeve member 68 to the carrier legs 58, as shown in FIG. 5.

In still other aspects, the present teachings provide methods for assembling planetary carrier assemblies, such as a two-component Ravigneaux carrier assembly 50. The methods may include forming the powder metal components, including the carrier member 52 and the cover member 54, with any desired features therein, as described above. The formation may include shaping and compressing the green powder metal components using suitable molds, as well as using forming rods, etc. The methods may then include aligning a powder metal carrier member 52 (including a carrier plate 56 having a plurality of integral carrier legs 58 extending therefrom) and a powder metal cover member 54 (including a cover plate 62 having a plurality of integral cover legs 64 extending therefrom). In various aspects, the alignment results in the respective ends 60 of the carrier legs 58 and ends 66 of the cover legs 68 being aligned with one another to form a subassembly similar to that best shown in FIGS. 2 and 5.

Once aligned, the method may include sintering the subassembly to secure the respective legs 60, 66 of the carrier member 52 to the cover member 54, preferably in a single plane. In various aspects, the method may include disposing a braze material adjacent the respective ends 60, 66 of the carrier legs 58 and the cover legs 64 prior to sintering the subassembly. In one example, either the carrier legs 58 or the cover legs 64 may be provided with a braze material retention aperture 76, as shown in FIG. 5.

In certain aspects, an auxiliary component, such as a sleeve member 68 may be brazed together with the carrier member 52 and the cover member 54. After the sintering process, a braze hub 70, or other component, may be welded to the sleeve member, as discussed above.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A planetary carrier assembly for a transmission, the carrier assembly comprising:
    a powder metal carrier member comprising a carrier plate including a plurality of carrier legs integral with and extending a distance from the carrier plate;
    a powder metal cover member comprising a cover plate having a plurality of cover legs integral with and extending a distance from the cover plate; and
    at least one auxiliary component,
    wherein respective ends of the carrier legs and ends of the cover legs are aligned with and secured to one another and secured to the auxiliary component by braze joints disposed in a single plane, and wherein at least one carrier leg or cover leg defines a braze material retention feature.

2. The planetary carrier assembly according to claim 1, wherein the auxiliary component comprises a sleeve member secured to one or both of the carrier member and the cover member.

3. The planetary carrier assembly according claim 2, further comprising a brake hub secured to the sleeve member.

4. The planetary carrier assembly according to claim 3, wherein an inner perimeter of the brake hub is welded to an outer perimeter of the sleeve member.

5. The planetary carrier assembly according to claim 1, wherein the carrier member and the cover member comprise the same powder metal composition.

6. The planetary carrier assembly according to claim 1, wherein the carrier member and the cover member comprise different powder metal compositions.

7. The planetary carrier assembly according to claim 1, comprising four spaced-apart cover legs joined to four spaced-apart carrier legs.

8. A Ravigneaux planetary carrier assembly for an automatic transmission, the carrier assembly comprising:
    a first set of pinion gears;
    a second set of pinion gears;
    a unitary, powder metal carrier member comprising a carrier plate having a plurality of integral carrier legs extending therefrom;
    a unitary, powder metal cover member comprising a cover plate having a plurality of integral cover legs extending therefrom; and
    at least one auxiliary component, wherein the auxiliary component and respective ends of the carrier legs and ends of the cover legs are aligned with and brazed to one another with a plurality of braze joints located in a single plane, and wherein at least one carrier leg or cover leg defines a braze material retention feature, the alignment of the powder metal cover member and the powder metal carrier member defining an interior of the carrier assembly configured to house the first and second sets of pinion gears.

9. The Ravigneaux planetary carrier assembly according to claim 8, wherein the auxiliary component comprises a steel sleeve member secured to the carrier legs.

10. The Ravigneaux planetary carrier assembly according to claim 8, wherein the carrier legs and the cover legs define respective inner walls and outer walls, and at least a portion of the inner walls of aligned carrier legs and cover legs are flush with one another in an assembled state.

11. A method for assembling a two-component Ravigneaux planetary carrier assembly, the method comprising:
- aligning (1) a powder metal carrier member comprising a carrier plate having a plurality of integral carrier legs extending therefrom, (2) a powder metal cover member comprising a cover plate having a plurality of integral cover legs extending therefrom, and (3) an auxiliary member, such that respective ends of the carrier legs and ends of the cover legs are aligned with one another and the auxiliary member in a single plane to form a subassembly;
- during the aligning step, disposing a braze material within a braze retention feature defined in at least one carrier leg or cover leg; and
- sintering the subassembly.

* * * * *